J. GAYNOR.
RESILIENT VEHICLE WHEEL.
APPLICATION FILED AUG. 10, 1912.
1,047,888.
Patented Dec. 17, 1912.
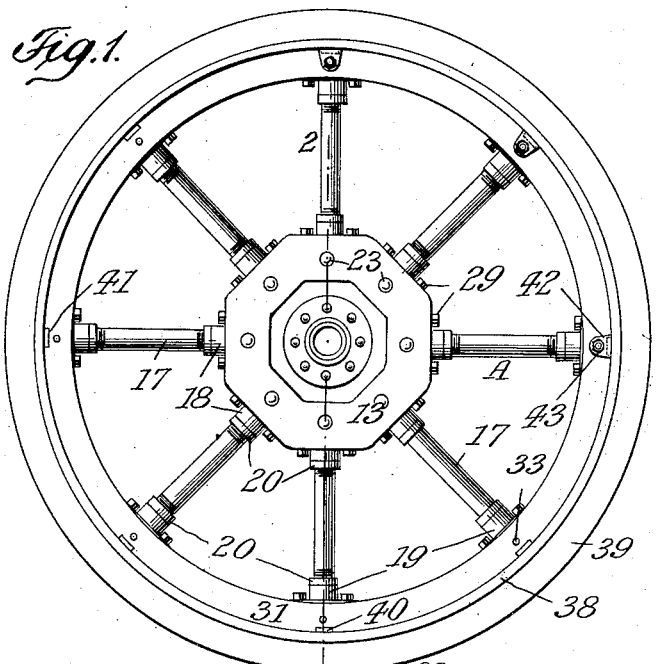
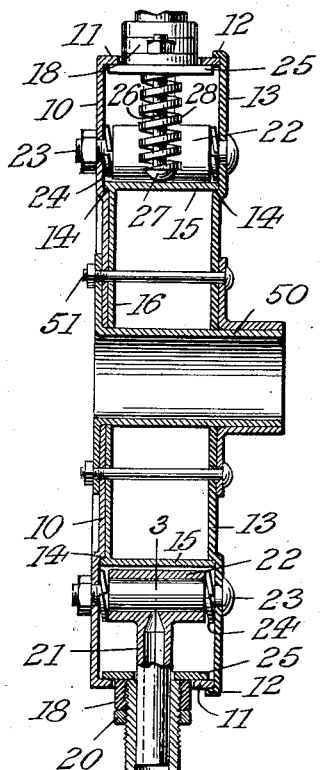
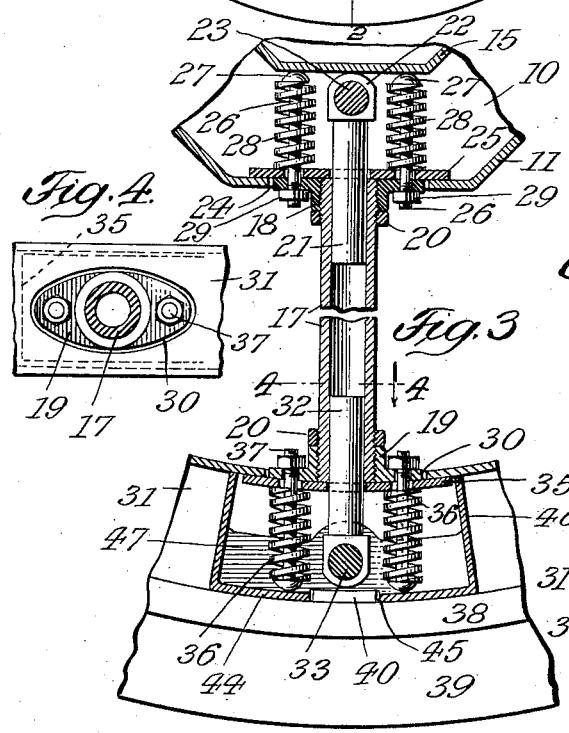
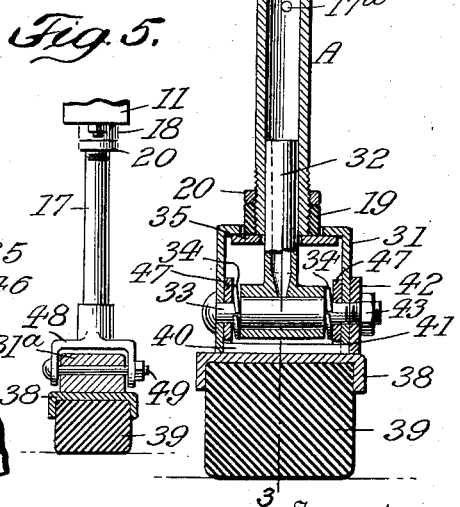
Inventor
Joseph Gaynor

UNITED STATES PATENT OFFICE.

JOSEPH GAYNOR, OF NEW YORK, N. Y., ASSIGNOR TO STANDARD RESILIENT WHEEL CO. INC., OF NEW YORK, N. Y., A CORPORATION.

RESILIENT VEHICLE-WHEEL.

1,047,888. Specification of Letters Patent. Patented Dec. 17, 1912.

Application filed August 10, 1912. Serial No. 714,340.

*To all whom it may concern:*

Be it known that I, JOSEPH GAYNOR, a citizen of the United States, residing at New York city, county and State of New York, have invented a new and Improved Resilient Vehicle-Wheel, of which the following is a specification.

This invention relates to a resilient vehicle wheel provided with spring-actuated spokes of novel construction that insure a smooth and easy running of the vehicle, so that pneumatic tires may be dispensed with.

The wheel is further so constructed that it contains but a minimum number of parts and that it may be readily adapted to axles of different dimensions, so it is unnecessary for the manufacturer to maintain an unduly large stock of different wheels to suit the different makes of automobiles and other vehicles.

In the accompanying drawing: Figure 1 is a side view of a vehicle wheel embodying my invention, with some of the parts omitted; Fig. 2 an enlarged axial section, partly broken away, on line 2—2, Fig. 1; Fig. 3 a longitudinal section partly broken away, on line 3—3, Fig. 2; Fig. 4 a cross section on line 4—4, Fig. 3, and Fig. 5 a sectional view of a modified form of the spokes.

The wheel hub is composed of a plate or disk 10 provided with an outer angular flange or shell 11, an octagonal flange being shown corresponding to the eight spokes A illustrated in Fig. 1. The free edge of flange 11 is overlapped by the correspondingly shaped rim 12 of a plate or disk 13 arranged opposite plate 10. The parts 10, 13 are provided with opposed octagonal shoulders 14 upon which is seated an angular flange 15 arranged concentrically to flange 11 and forming part of a web 16 that is placed flat against plate 10. Each spoke A is composed of a tubular sleeve 17 having right and left threaded ends which are tapped into the inner and outer cross heads 18, 19 respectively. If desired, jam nuts 20 may be provided for holding the parts in the position to which they have been set. Into the inner end of sleeve 17 is loosely fitted a hollow plunger 21 provided with a perforated cross piece 22 which is accommodated between plates 10, 13 and is fulcrumed thereto by a screw bolt 23, resilient washers 24 being preferably interposed between cross piece 22 and said plates. Cross head 18 is loosely received within a corresponding cut-out 24 of shell 11 and rests normally against the outer face of a plate 25 which in turn normally rests against the inner face of shell 11. Cross head 18 and plate 25 are perforated for the passage of a pair of screw bolts 26, between the heads 27 of which and plate 25 are interposed springs 28. The nuts 29 of bolts 26 are so adjusted that when plate 25 rests against shell 11, heads 27 bear against flange 15, the springs 28 being always under considerable tension. In like manner, each cross head 19 is received within a corresponding cut-out 30 of the wheel rim 31 which is of U-shaped cross section as illustrated in Fig. 3. Into the outer end of sleeve 17 is loosely fitted a hollow T-shaped plunger 32 accommodated between the flanges of the rim and fulcrumed thereto by a bolt 33, resilient washers 34 being interposed between said plunger and flanges. Cross head 19 is held against a curved plate 35 by springs 36 encompassing headed bolts 37, the parts 32, 33, 35, 36, 37 being substantial duplicates of the parts 21, 23, 25, 28, 26 above described. Rim 31 is snugly embraced by a flanged ring 38 that in turn receives the preferably solid tire 39 made of rubber or other resilient material.

In order to securely hold ring 38 to rim 31, the former is provided with a plurality of transverse ribs 40 arranged in radial alinement with spokes A and engaging corresponding notches 41 provided in one of the flanges of rim 31. In assembling the parts, ring 38 is slipped over rim 31 with its ribs 40 engaging the notches 41 until said ribs abut against the solid rim-flange. A rib-retaining plate 42 is then interposed between the notched flange and the nut 43 of each bolt 33, to securely hold ring 38 with tire 39 in position.

In order to prevent any dust of the road from creeping in between springs 36, the latter are inclosed by a housing 44 abutting against ring 38 and notched as at 45 for the reception of ribs 40. The end walls 46 of this housing extend upward against the transverse web of the U-shaped rim 31, while its side walls 47 are of less height to permit a free movement of plate 35. Walls 47 are perforated for the reception of bolts 33 which thus maintain the housings in position. Before assembling the parts, sleeves 17 and plungers 21, 32 are filled with grease which, owing to the telescoping movement of said sleeves and plungers, will insure a thorough lubrication, while the grease may be replenished from time to time through a hole 17ᵃ of sleeve 17.

During travel, the sagging of the wheel axle will cause a telescoping action between the plungers 21, 32 and the sleeves 17 of the bottom spokes, so that all four springs of each spoke are simultaneously compressed. At the same time the four springs of the top spokes are also compressed owing to the lengthening of said spokes, whereby plates 25 will recede from rim 11. Simultaneously with the described shortening and lengthening of the bottom and top spokes respectively, the lateral spokes will be reflected out of their normal radial position. This movement of the spokes can take place owing to their hinged connection with the hub and wheel rim, and will likewise cause a compression of springs 28 and 36. In this way, all of the spring-influenced spokes are utilized for taking up the shock, so that a smooth and easy running of the vehicle is insured.

In case of light vehicles, the outer springs 36 and coöperating parts may be entirely dispensed with, as illustrated in Fig. 5. In this case, there is secured to the outer end of each sleeve 17, a forked member 48 which is by bolt 49 fulcrumed to the solid rim 31ᵃ of the wheel.

The wheels are held in stock without having provided plates 10, 16 and 13 with central perforations, so that the wheels may be fitted to axles of any configuration and diameter. If the proper dimensions of the axles etc. have been ascertained, corresponding bores are provided in parts 10, 16 and 13 to accommodate the central hub section 50 to which the wheel is secured by bolts 51.

I claim:

1. In a resilient vehicle wheel, a pair of parallel disks, an inner flange and a concentric apertured outer flange interposed between said disks, a sectional spoke accommodated by the aperture of the outer flange, means for pivoting one spoke member to the disks, a cross head carried by the other spoke member, and a pair of springs interposed between said cross head and the inner flange.

2. In a resilient vehicle wheel, a pair of parallel disks, a pair of concentric polygonal flanges arranged therebetween, the outer flange being provided with a plurality of apertures, sectional spokes accommodated by said apertures, means for pivoting one member of each spoke to the disks, a cross head carried by the other member of each spoke, and a pair of springs interposed between each cross head and the inner flange.

3. In a resilient vehicle wheel, a pair of parallel disks, an inner flange and a concentric apertured outer flange interposed between said disks, a sectional spoke accommodated by the aperture of the outer flange, means for pivoting one spoke member to the disks, a cross head carried by the other spoke member, a plate adapted to engage said cross head and the outer flange, and a pair of springs interposed between said plate and the inner flange.

4. In a resilient vehicle wheel, a pair of parallel disks, a pair of concentric flanges arranged therebetween, a sleeve, a cross head adjustably secured thereto, a plate adapted to engage said cross head and the outer flange, a T-shaped plunger telescoped by the sleeve and pivoted to the disk, and springs interposed between the plate and the inner flange.

5. In a vehicle wheel, a rim of U-shaped cross section, a sleeve, a cross head adjustably secured thereto, a plate adapted to engage said cross head and the rim, a T-shaped plunger telescoped by the sleeve and pivoted to the rim, a ring encompassing the rim, and springs interposed between the plate and the ring.

6. In a vehicle wheel, a rim of U-shaped cross section, a sleeve, a cross head adjustably secured thereto, a plate adapted to engage said cross head and the rim, a T-shaped plunger telescoped by the sleeve and pivoted to the rim, a ring encompassing the rim, a dust-protecting housing accommodated within the U-shaped rim and abutting against the ring, and springs interposed between the plate and the housing.

7. In a vehicle wheel, a rim of U-shaped cross section, a sleeve, a cross head adjustably secured thereto, a plate adapted to engage said cross head and the rim, a T-shaped plunger telescoped by the sleeve and pivoted to the rim, a ring encompassing the rim, means for securely holding the ring to the rim, springs interposed between the plate and the ring, and a tire carried by the ring.

JOSEPH GAYNOR.

Witnesses:
P. B. VERPLANCK,
B. B. VERPLANCK.

---

Copies of this patent may be obtained for five cents each, by addressing the "Commissioner of Patents. Washington, D. C."